United States Patent
Chung et al.

(10) Patent No.: US 8,102,378 B2
(45) Date of Patent: Jan. 24, 2012

(54) DISPLAY HAVING INFRARED EDGE ILLUMINATION AND MULTI-TOUCH SENSING FUNCTION

(75) Inventors: In Jae Chung, Gyeonggi-do (KR); In Ho Ahn, Gyeonggi-do (KR); Seong Ho Baik, Gyeonggi-do (KR); Sang Hyuck Bae, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1154 days.

(21) Appl. No.: 11/904,976

(22) Filed: Sep. 26, 2007

(65) Prior Publication Data
US 2008/0252618 A1  Oct. 16, 2008

(30) Foreign Application Priority Data
Sep. 26, 2006 (KR) .................. 10-2006-0093710

(51) Int. Cl.
*G09G 5/00* (2006.01)

(52) U.S. Cl. ..... 345/173; 345/174; 345/176; 178/18.01; 178/18.11

(58) Field of Classification Search .................. 345/156, 345/173–179, 207; 178/18.01–18.03, 18.11
See application file for complete search history.

(56) References Cited

U.S. PATENT DOCUMENTS

| | | | | |
|---|---|---|---|---|
| 5,438,198 A | * | 8/1995 | Ebitani et al. | 250/330 |
| 5,510,627 A | * | 4/1996 | Snow | 257/21 |
| 6,809,726 B2 | * | 10/2004 | Kavanagh | 345/173 |
| 2006/0097991 A1 | * | 5/2006 | Hotelling et al. | 345/173 |
| 2006/0187367 A1 | * | 8/2006 | Abileah et al. | 349/37 |
| 2007/0084989 A1 | * | 4/2007 | Lange et al. | 250/221 |

* cited by examiner

*Primary Examiner* — Quan-Zhen Wang
*Assistant Examiner* — Jennifer Nguyen
(74) *Attorney, Agent, or Firm* — Brinks Hofer Gilson & Lione

(57) ABSTRACT

A touch-sensing display screen includes an upper transparent substrate, a lower substrate opposite the upper substrate and an infrared light source configured to illuminate a portion of the upper transparent substrate. A light converting layer is disposed between the upper and lower substrate and is configured to convert the infrared light received by the upper transparent substrate to visible light. A pixel thin-film transistor on the lower substrate is configured to activate a pixel electrode, and a light-sensing thin-film transistor is configured to sense the visible light provided by the light converting layer. A light-sense signal is output in response to activation of the light-sensing thin-film transistor.

22 Claims, 11 Drawing Sheets

DISPLAY HAVING INFRARED EDGE ILLUMINATION AND MULTI-TOUCH SENSING FUNCTION

This application claims the benefit of Korean Patent Application No. P2006-093710, filed on Sep. 26, 2006, which is hereby incorporated by reference.

BACKGROUND

1. Field of the Invention

The present invention relates to a display, and more particularly to a display that is capable of multi-touch sensing, and a driving method thereof.

2. Description of the Related Art

Generally, a touch panel is a type of user interface that may be attached to a surface of a display device, where an electrical characteristic is changed at a touch area where a finger of a user or other instrument contacts the touch panel so as to sense the touch area thereof. The application for touch panels extends to small portable terminals, office equipment and the like. If two or more touches are simultaneously generated, the touch panel might malfunction or any one of the touches may be selected by a pre-set program.

Figure 1:
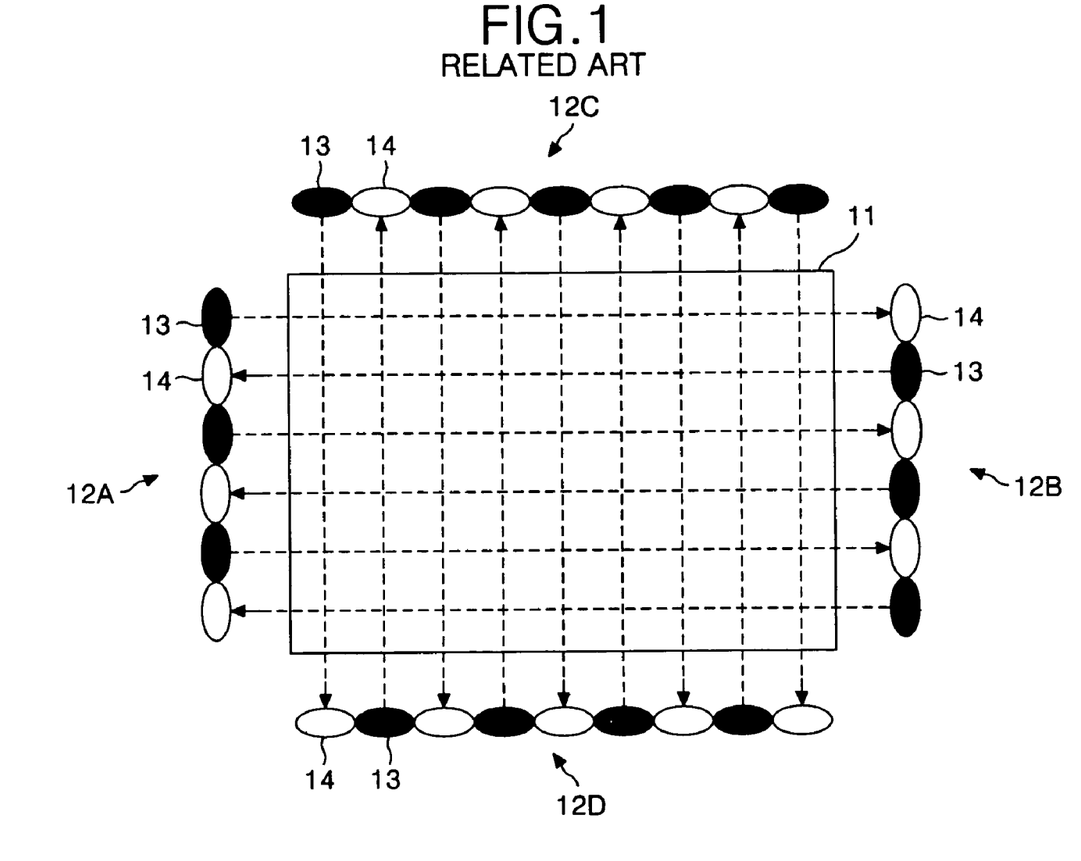
FIG. 1 is a plan view schematically showing a multi-touch device.
Figure 2:
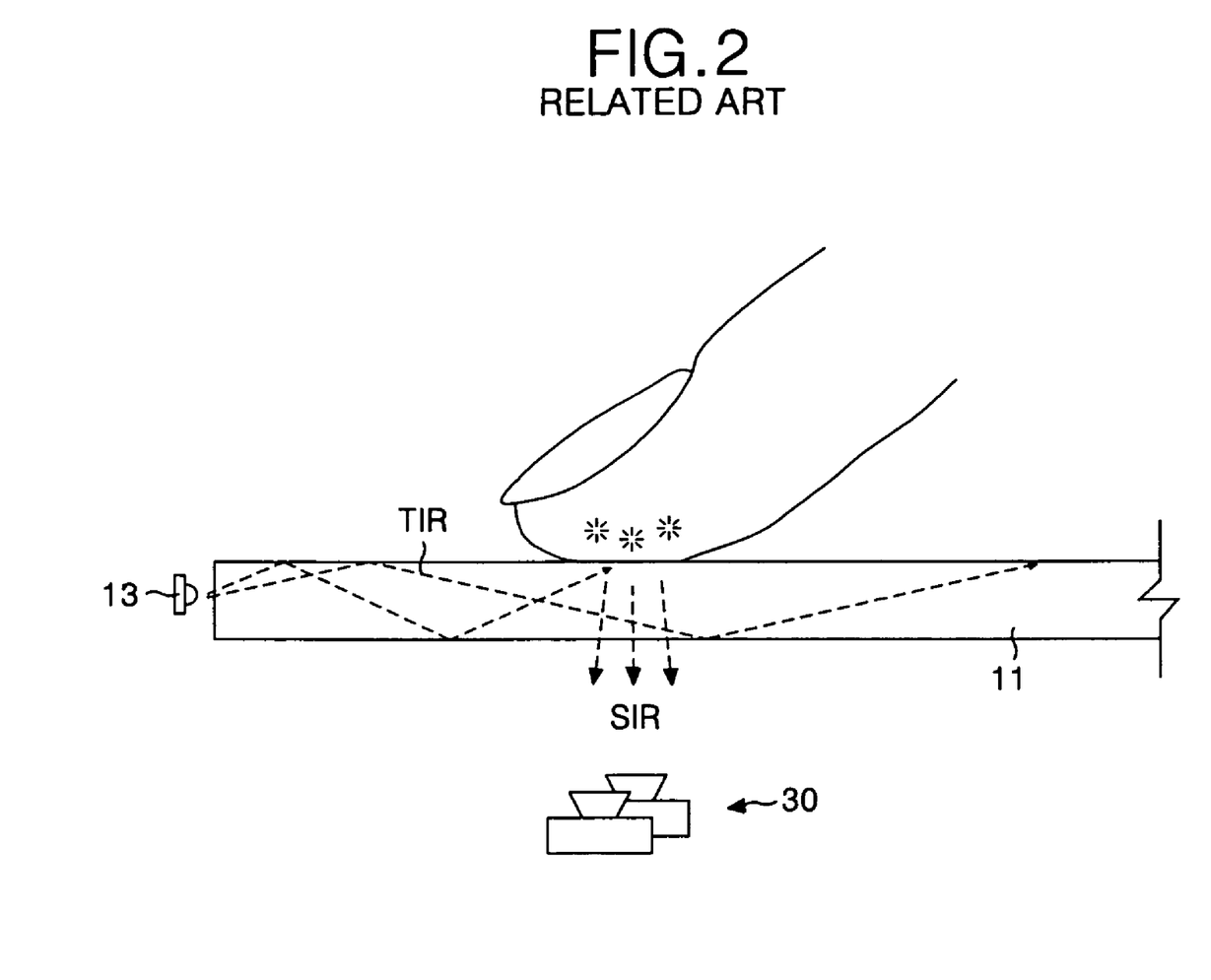
FIG. 2 and FIG. 3 show a related multi-touch device.
Figure 3:
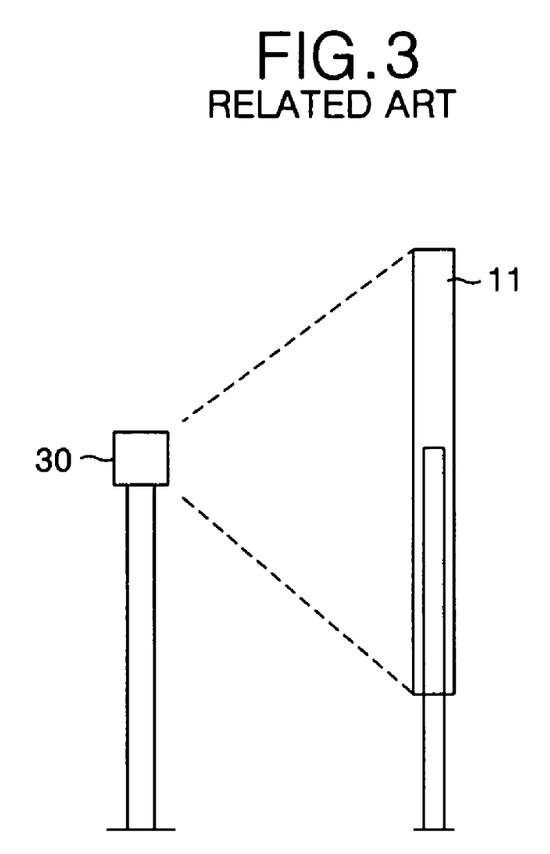

FIGS. 1-3 show known multi-touch devices that have attempted to overcome the limitations of multi-touch recognition systems.

Referring to FIG. 1, the multi-touch device of the related art includes a transparent acrylic plate 11, first through fourth IRLED (infrared or IR light-emitting diode) arrays 12A-12D, and first through fourth IRPD (infrared or IR photo-detector) arrays 12A to 12D. The IRLED arrays and IRPD arrays 12A to 12D include a plurality of IR light emitting diodes 13 and a plurality of IR photo detectors 14.

FIG. 2 shows that a hand of the user or a pen is directly in contact with the transparent acrylic plate 11.

The IRLED and IRPD arrays 12A to 12D are arranged to face a side surface of the transparent acrylic plate 11.

Infrared light is radiated from the IRLED 13 through the transparent acrylic plate 11. The infrared light is received by the corresponding IRPD 14. In this state, if a hand or a pen is in contact with the transparent acrylic plate 11, the infrared light is scattered and is not received at the corresponding IRPD 14 on the contact (or touch) area. Accordingly, the multi-touch device in FIG. 1 may recognize an erroneous touch location.

A multi-touch device of the related art in FIG. 1 has an advantage of being thin. However, the multi-touch device of the related art is disadvantageous because the multi-touch recognition is inaccurate due to direct illumination by infrared light. Further, the effective display surface is reduced by the area occupied by the IRLED and IRPD arrays 12A to 12D.

FIG. 2 and FIG. 3 show a projector-type multi-touch device.

The multi-touch device includes a camera and projector module 30, which are located at a rear portion of the transparent acrylic plate 11.

If a finger of the user is in contact with an arbitrary point on the transparent acrylic plate 11, an infrared ray is scattered by the finger or other object. The scattered infrared ray is incident on the camera and projector 30. Such a scattered infrared ray SIR is sensed so that the projector-type multi-touch device can sense a multi-touch area.

However, because the distance between the transparent acrylic plate 11 and the camera and projector module 30 is relatively long, the multi-touch device in FIG. 2 and FIG. 3 occupies a wide space. Furthermore, since the multi-touch device in FIG. 2 and FIG. 3 displays an image using a projector, the type of display device and the design of the display device is limited. Additionally, the life span of the projection lens is limited.

The multi-touch devices in FIG. 1 to FIG. 3 transmit signals from the camera and projector module 30 to an external computer via a cable, and process the signals by an external computer. Thus, the system is complicated, the space occupied by the components is large, and a signal transmitting path is relatively long.

SUMMARY

A touch-sensing display screen includes an upper transparent substrate, a lower substrate opposite the upper substrate and an infrared light source configured to illuminate a portion of the upper transparent substrate. A light converting layer is disposed between the upper and lower substrate and is configured to convert the infrared light received by the upper transparent substrate to visible light. A pixel thin-film transistor on the lower substrate is configured to activate a pixel electrode, and a light-sensing thin-film transistor is configured to sense the visible light provided by the light converting layer. A light-sense signal is output in response to activation of the light-sensing thin-film transistor.

BRIEF DESCRIPTION OF THE DRAWINGS

The invention will be apparent from the following detailed description of the embodiments with reference to the accompanying drawings, in which.

DETAILED DESCRIPTION

Figure 4:
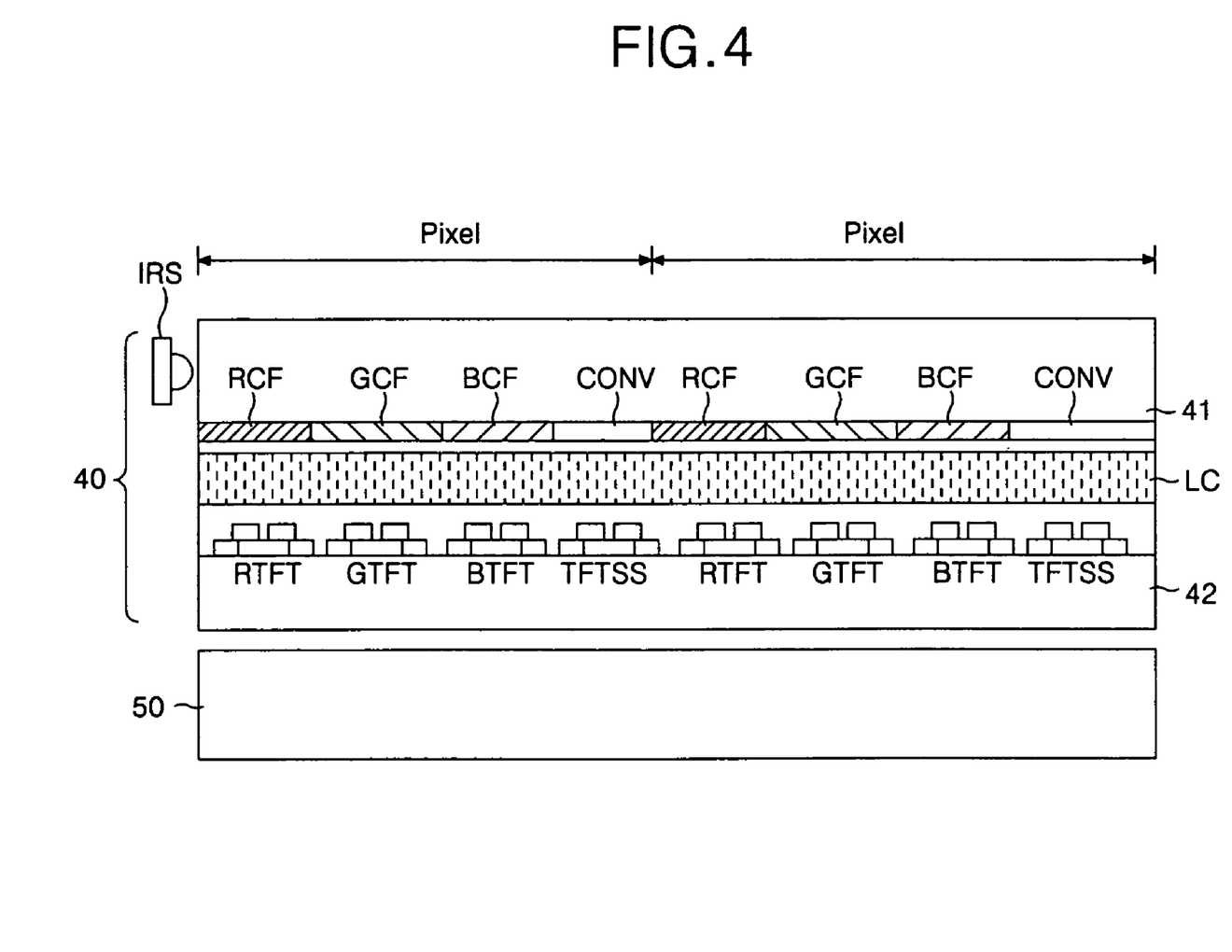
FIG. 4 is a sectional view showing a display having a multi-touch sensing function according to an embodiment.

Referring to FIG. 4, a display having a multi-touch sensing function includes a display panel 40, an infrared light source IRS, and a backlight unit 50. The display panel 40 has an infrared ray to visible ray converting layer CONV and a thin film transistor (TFT) for sensing light TFTSS. The infrared light source IRS radiates infrared light to the display panel 40. The backlight unit 50 radiates visible light to the display panel 40.

The display panel 40 includes an upper transparent substrate 41, a lower transparent substrate 42, and a liquid crystal layer LC. The upper transparent substrate 41 has color filters RCF, GCF, and BCF, and an infrared ray to visible ray converting layer CONV. The lower transparent substrate 42 has a pixel TFT and a TFT for sensing light TFTSS that select a pixel. The liquid crystal layer LC is formed between the upper transparent substrate 41 and the lower transparent substrate 42.

The upper transparent substrate 41 may be formed of a transparent plastic substrate, such as an acrylic plate, a glass substrate and the like. However, the glass substrate is more economical because a plastic or acrylic plate has a wide light diffusing angle when touched, is relatively thick, and is easily scratched or damaged.

The color filters RCF, GCF, and BCF, the infrared ray to visible ray converting layer CONV and a black matrix are formed on the upper transparent substrate 41 of the display panel 40.

An infrared light source emitter IRS generates infrared light, and is disposed opposite a side surface of the upper transparent substrate 41 of the display panel 40 so as to radiate infrared light through the upper transparent substrate 41. The infrared light source IRS may be an infrared light emitting diode.

When a hand of the user or an opaque object contacts the upper transparent substrate 41, the infrared light is scattered. The infrared ray to visible ray converting layer CONV converts the scattered infrared light into light having a visible wavelength, which is sensed by the TFT for sensing light TFTSS. The infrared ray to visible ray converting layer CONV may be formed of any material that is capable of converting infrared light into visible light. For example, the infrared ray to visible ray converting layer CONV may include Titanyl phthalocyanine TiOPc. The Titanyl phthalocyanine TiOPc converts near-infrared light into light having a blue light wavelength.

A common electrode is opposite a pixel electrode with the liquid crystal layer LC therebetween. The common electrode is supplied with a common voltage and is formed on the upper transparent substrate 41 according to Twisted Nematic (TN) mode and a Vertical Alignment (VA) mode. The common electrode is formed on the lower transparent substrate 42 in an In-Plane Switching (IPS) mode and a Fringe Field Switching (FFS) mode.

A polarizer that selects a linear polarization, and an alignment film that determines a pre-tilt of a liquid crystal molecule, are formed at each of the upper/lower transparent substrates 41 and 42 of the display panel 40.

A plurality of data lines and a plurality of gate lines cross each other on the lower transparent substrate 42. A plurality of driving voltage supplying line, which are parallel to the gate lines, and a plurality of read-out lines, which cross the gate lines and the driving voltage supplying lines, are formed on the lower transparent substrate 42. The TFTs for selecting a pixel are formed at the intersection of the data lines and the gate lines. The TFT for sensing light TFTSS is formed at the intersection of the driving voltage supplying lines and the read-out lines. The TFTs are connected to a pixel electrode. The TFTs for selecting a pixel supply a data voltage from the data line to the pixel electrode in response to a scanning signal from the gate line.

The TFT for sensing light TFTSS is an optical sensor, which senses an amount of visible light converted by the infrared ray to visible ray converting layer CONV located in the vicinity of the touch area. The TFT for sensing light TFTSS is an amorphous silicon TFT or a polysilicon TFT, which has the same structure as the TFT for selecting a pixel, and is formed on the lower transparent substrate 42. It is not necessary to have a TFT for sensing light TFTSS for each pixel. Thus, there may be only one TFT for sensing light TFTSS for each N number of pixels, where the number N is a selected design parameter. The number of pixels between each TFT for sensing light TFTSS may be adjusted.

The backlight unit 50 is positioned under the display panel 40 opposite the lower transparent substrate 42. The backlight unit 50 is an edge type backlight unit or a direct type backlight unit.

Figure 5:
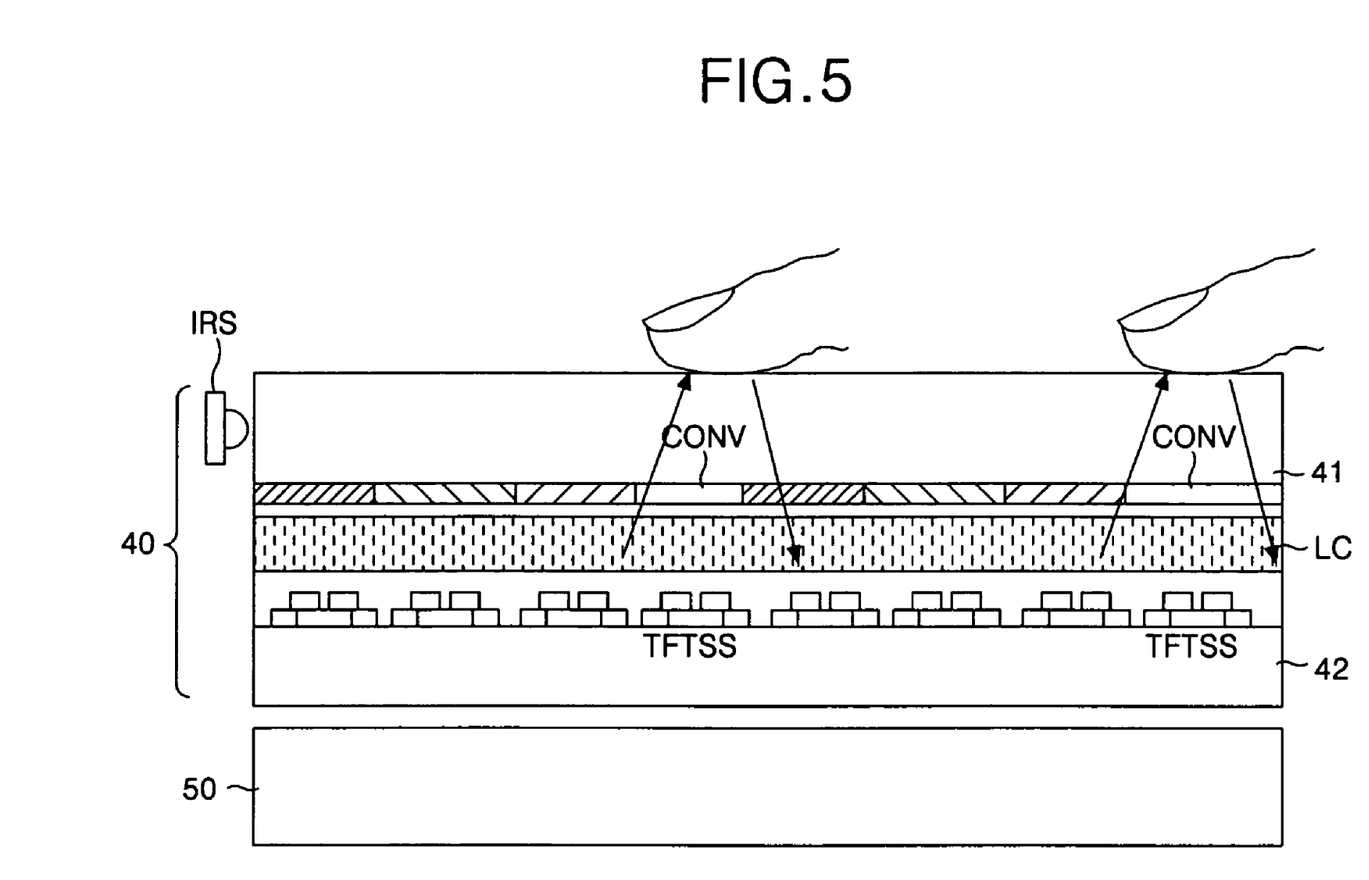
FIG. 5 is a sectional view showing an operation of the display having a multi-touch sensing function in FIG. 4.

FIG. 5 shows a multi-touch operation of a liquid crystal display having a multi-touch sensing function.

If a finger of the user or an opaque object contacts the upper transparent substrate 41 of the display panel 40 when the infrared light source IRS is on, refractivity between the upper transparent substrate 41 and a contacting material thereon is changed at the contact surface. As a result, an infrared light is scattered at the contact surface and is reflected toward the lower transparent substrate 42.

The reflected infrared light is converted to visible light by the infrared ray to visible ray converting layer CONV, which then irradiates a semiconductor layer of the TFT for sensing light TFTSS, which is formed on the lower transparent substrate 42. The TFT for sensing light TFTSS generates a photo current, which is received at the semiconductor layer. The photo current is outputted via the read-out line. The digital signal processing circuit analyzes the photo current. As a result, a coordinate value of a touch area is calculated, and the digital signal processing circuit recognizes a plurality of touch areas. At the same time, a touch image of a touch area is displayed at the display panel 40.

FIG. 6 to FIG. 9 are diagrams for explaining a structure and an operation of a sub-pixel on which the TFT for sensing light TFTSS is formed.

Figure 6:
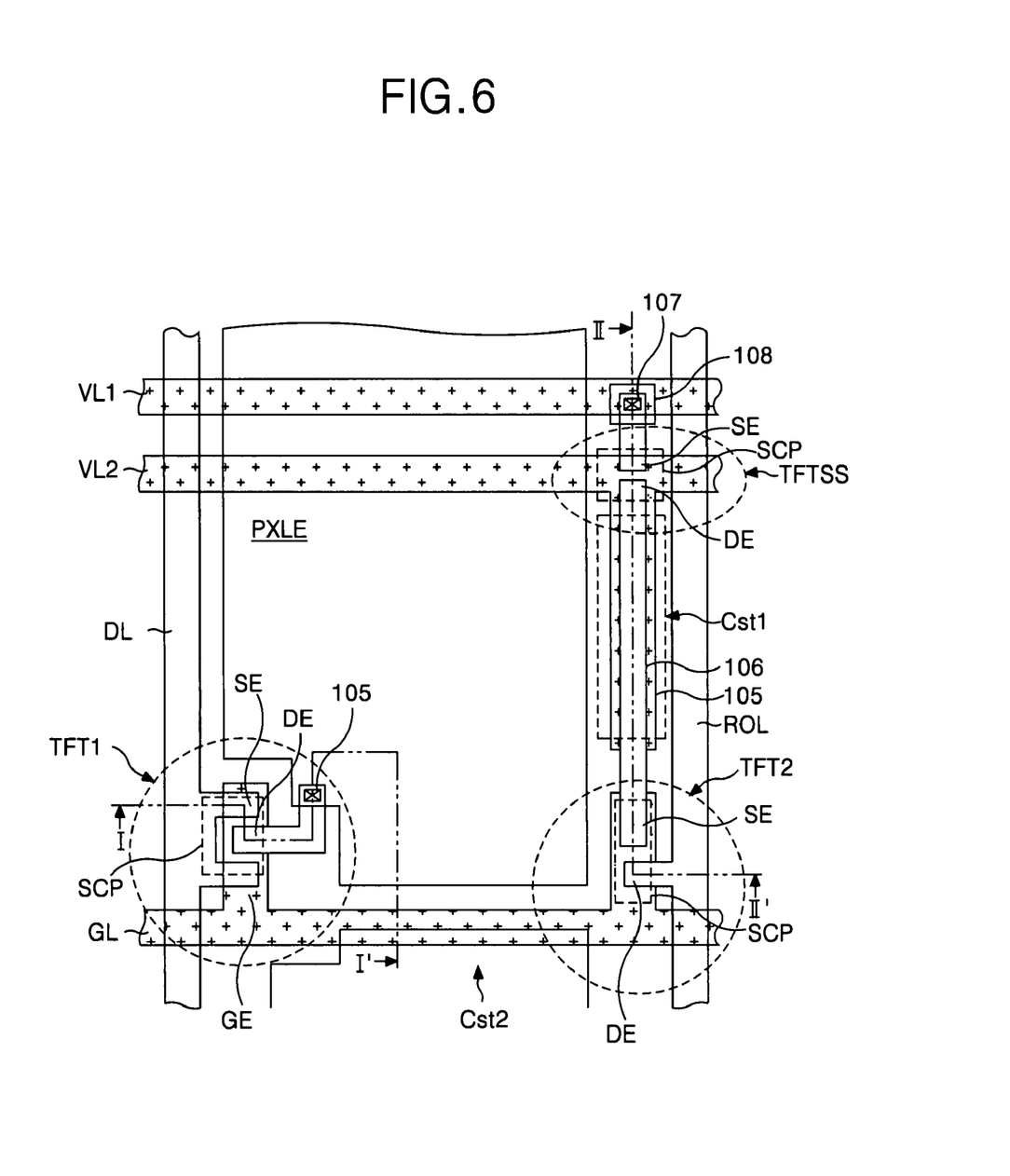
FIG. 6 is a plan view of a sub-pixel where a TFT for sensing light is formed.
Figure 7:
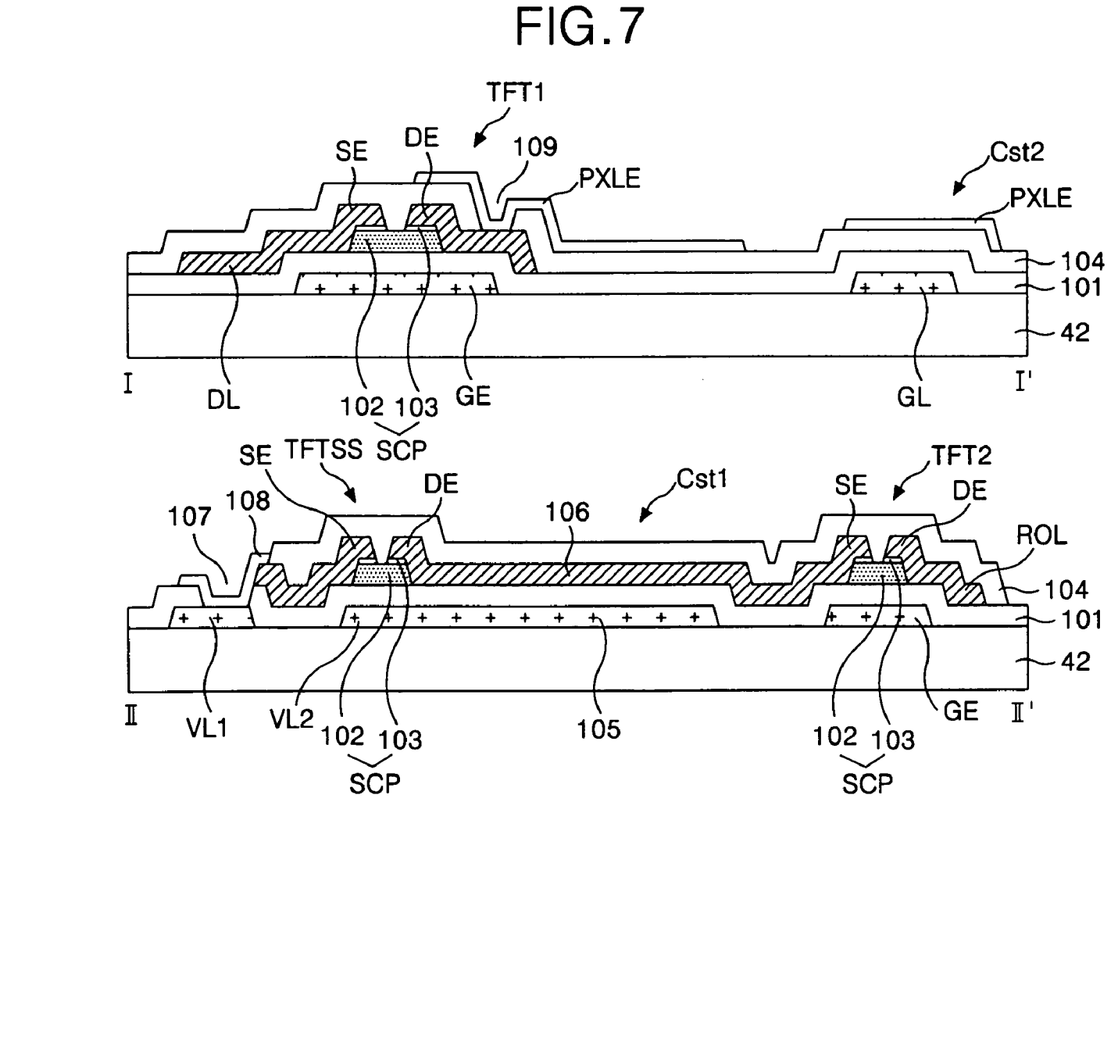
FIG. 7 is a sectional view taken along the line I-I' and II-II' of FIG. 6.

Referring to FIG. 6 and FIG. 7, the lower transparent substrate 42 of the display panel 40 includes a gate line (or a scanning line) GL, a data line DL, a first TFT TFT1, a pixel electrode PXLE, a read-out line ROL, first and second driving voltage supply lines VL1 and VL2, a TFT for sensing light TFTSS, and a second TFT TFT2. The gate line GL and the data line DL cross each other with a gate insulating film 101 therebetween. The first TFT TFT1 is formed at the intersection of the gate line GL and the data line DL. The pixel electrode PXLE is formed at a cell area defined by the gate line GL and the data line DL.

The read-out line ROL is formed in parallel to the data line DL having the pixel electrode PXLE therebetween. The first and second driving voltage supply lines VL1 and VL2 are formed parallel to the gate line GL to supply first and second driving voltages. The TFT for sensing light TFTSS is formed at the intersection of the first driving voltage supply line VL1 and the read-out line ROL. The second TFT TFT2 is formed at the intersection of the gate line GL and the read-out line ROL.

The lower transparent substrate 42 of the display panel 40 includes a first storage capacitor Cst1 and a second storage capacitor Cst2. The first storage capacitor Cst1 is electrically connected to the second driving voltage supply line VL2 between the TFT for sensing light TFTSS and the second TFT TFT2. The second storage capacitor Cst2 is formed at an overlapping area of the pixel electrode PXLE and the pre-stage gate line GL.

The first TFT TFT1 includes a gate electrode GE, a source electrode SE, a drain electrode DE, and an active layer 102. The gate electrode GE is connected to the gate line GL. The source electrode SE is connected to the data line DL. The drain electrode DE is connected to the pixel electrode PXLE. The active layer 102 is overlapped with the gate electrode GE and forms a channel between the source electrode SE and the drain electrode DE.

The active layer 102 is overlapped with the data line DL, the source electrode SE, and the drain electrode DE. An ohmic contact layer 103, which makes an ohmic contact with the data line DL, the source electrode SE, and the drain electrode DE, is formed on the active layer 102. The active layer 102 is formed from a semiconductor layer of amorphous silicon or polysilicon. Such an active layer 102 and an ohmic contact layer 103 are patterned as a predetermined semiconductor pattern SCP.

The first TFT TFT1 is turned-on by a high-voltage of a gate signal (or a scanning signal) with which the gate line GL is supplied to provide a data voltage from the data line DL to the pixel electrode PXLE. A gate high-voltage is a voltage greater than a threshold voltage of the first TFT TFT1. Conversely, a low logical voltage of a gate signal is a voltage less than a threshold voltage of the first TFT TFT1.

The pixel electrode PXLE is a transparent electrode, such as an Indium Tin Oxide ITO, and is connected via a first contact hole 109, which passes through a protective film 104, to the drain electrode DE of the first TFT TFT1. A potential difference is generated between the pixel electrode PXLE and a common electrode. The common electrode is formed at the upper transparent substrate 41 or the lower transparent substrate 42. Liquid crystal molecules are rotated due to the potential difference therebetween to change refractivity of a light, which is emitted by the backlight unit 50.

The second storage capacitor Cst2 is formed by the pre-stage gate line GL and the pixel electrode PXLE, which overlap each other with the gate insulating film 101 and the protective film 104 disposed therebetween. The gate insulating film 101 and the protective film 104 are located between the gate line GL and the pixel electrode PXLE. The second storage capacitor Cst2 maintains a voltage of the pixel electrode PXLE until the next data voltage is charges the pixel electrode PXLE.

The TFT for sensing light TFTSS is a TFT that produces a photo current flow via a channel between a source electrode and a drain electrode when irradiated by infrared light. The TFT for sensing light TFTSS includes the gate electrode GE, the active layer 102, the source electrode SE, and the drain electrode 162. The gate electrode GE is integral with the second driving voltage supplying line VL2. The active layer 102 overlaps the gate electrode GE with the gate insulating film 101 therebetween. The source electrode SE is connected to the first driving voltage supply line VL1 on the active layer 102. The drain electrode 162 is opposite to the source electrode SE on the active layer 102.

The active layer 102 is formed from semiconductor material, such as amorphous silicon or polysilicon, by the same process used to form the first and second TFTs TFT1 and TFT2. The active layer 102 is simultaneously formed along with the TFTs TFT1 and TFT2. The ohmic contact layer 103, which makes an ohmic contact with the source electrode SE and the drain electrode DE, is formed on the active layer 102. A source electrode of the TFT for sensing light TFTSS is electrically connected via a second contact hole 107, which passes through the protective film 104 and the gate insulating film 101, to expose a part of the first driving voltage supply line VL1, and a transparent electrode pattern 108, which is formed at the second contact hole 107, to the first driving voltage supply line.

The drain electrode DE of the TFT for sensing light TFTSS, an upper electrode 106 of the first storage capacitor Cst1, and the source electrode SE of the second TFT TFT2, are integrated with each other from the same metal to be electrically connected to each other. The TFT for sensing light TFTSS senses infrared light that is reflected from a finger or an opaque object.

The first storage capacitor Cst1 includes a first storage lower electrode 105 and a first storage upper electrode 106. The first storage lower electrode 105 is integral to the gate electrode GE of the TFT for sensing light TFTSS. The first storage upper electrode 106 is overlapped with the first storage lower electrode 105 with the gate insulating film 101 therebetween, and is connected to the drain electrode DE of the TFT for sensing light TFTSS. The first storage capacitor Cst1 stores an electric charge by a photo current which is generated from the TFT for sensing light TFTSS.

The second TFT TFT2 includes the gate electrode GE, the source electrode SE, the drain electrode DE, and the active layer 102. The gate electrode GE is formed on the lower transparent substrate 42. The source electrode SE is connected to the first storage upper electrode 106. The drain electrode DE is opposite the source electrode SE with a channel therebetween. The active layer 102 overlaps the gate electrode GE, which is connected to the gate line GL, and forms a channel between the source electrode SE and the drain electrode DE. The active layer 102 is formed of semiconductor material, such as amorphous silicon or polysilicon, etc.

The ohmic contact layer 103, which makes an ohmic contact with the source electrode SE and the drain electrode DE, is formed on the active layer 102. A second TFT TFT2 is turned-on by a gate high voltage from the gate line GL to supply an electric charge, which charges the first storage capacitor Cst, to the read-out line ROL.

Figure 8:
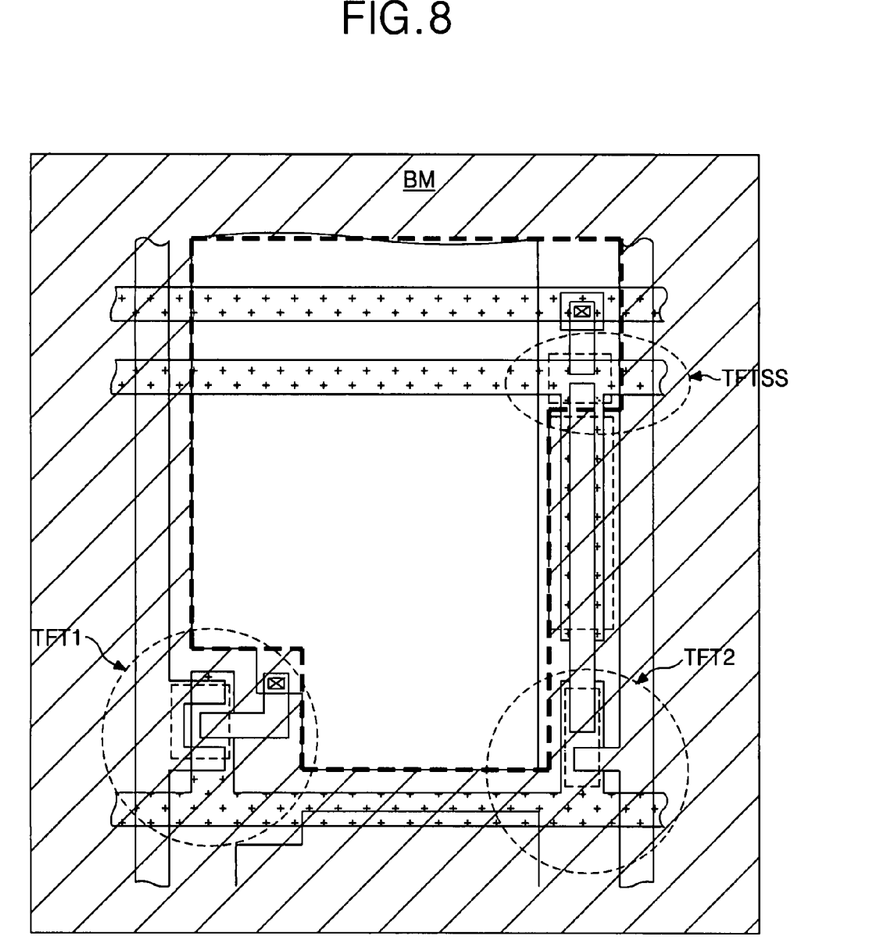
FIG. 8 is a plan view showing a black matrix and an exposed area at the sub-pixel in FIG. 7.

Areas other than the TFT for sensing light TFTSS and the pixel electrode PXLE within the pixel area, are shielded by a black matrix BM, which is formed at the upper transparent substrate 41, as shown in FIG. 8. Accordingly, visible light, which is reflected by the material in contact with the upper transparent substrate 41, is received only by the TFT for sensing light TFTSS.

Figure 9:
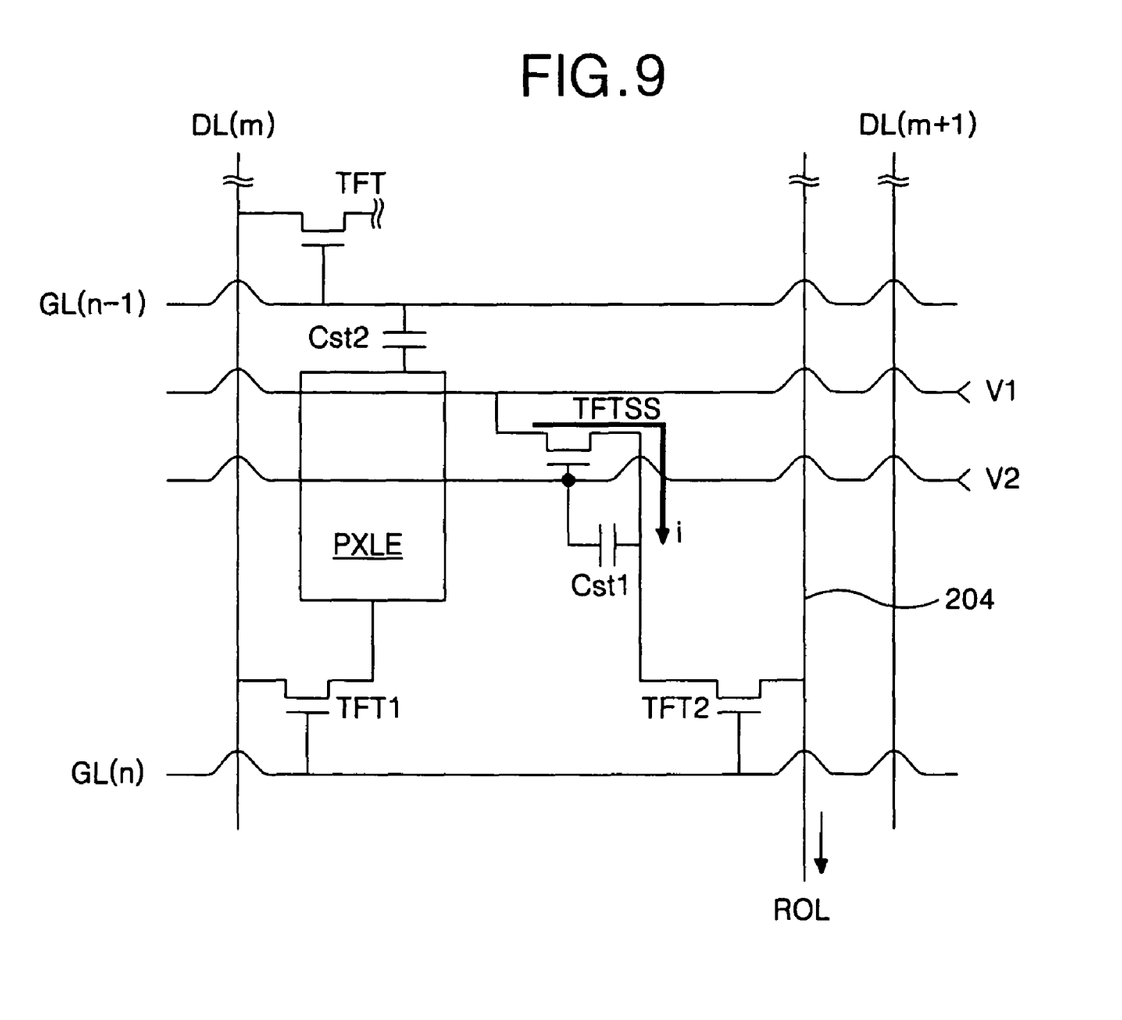
FIG. 9 is an equivalent circuit diagram of the sub-pixel in FIG. 6.

An operation of such a sub-pixel will be described in conjunction with FIG. 9.

An infrared light is radiated into the active layer 102 of the TFT for sensing light TFTSS. During this time a first driving voltage V1 of about 10V is applied to the source electrode SE of the TFT for sensing light TFTSS from the first driving voltage supply line VL1, and a second driving voltage V2 of about 0V to 10V is applied to the gate electrode of the TFT for sensing light TFTSS from the second driving voltage supply line VL2.

A photo current "i" flows from the source electrode SE to the drain electrode 162 via the active layer 102 in accordance with an intensity of the infrared light. The photo current i flows from the drain electrode DE to the first storage upper electrode 106 and because the first storage lower electrode 105 is connected to the gate electrode GE of the TFT for sensing light TFTSS, an the photo current charges the first storage capacitor Cst1. A maximum charge of the first storage capacitor Cst1 corresponds to a voltage difference between the source electrode SE and the gate electrode GE.

If a gate high-voltage is supplied to the gate electrode GE of the second TFT TFT2 when the TFT for sensing light TFTSS senses visible light and the first storage capacitor Cst1 charges, the second TFT TFT2 is turned-on and the electric charge, which charged the first storage capacitor Cst1, is supplied to a read-out integrated circuit (not shown) via the combination of the source electrode SE of the second TFT TFT2, a channel of the active layer 102, the drain electrode DE, and the read-out line ROL.

Figure 10:
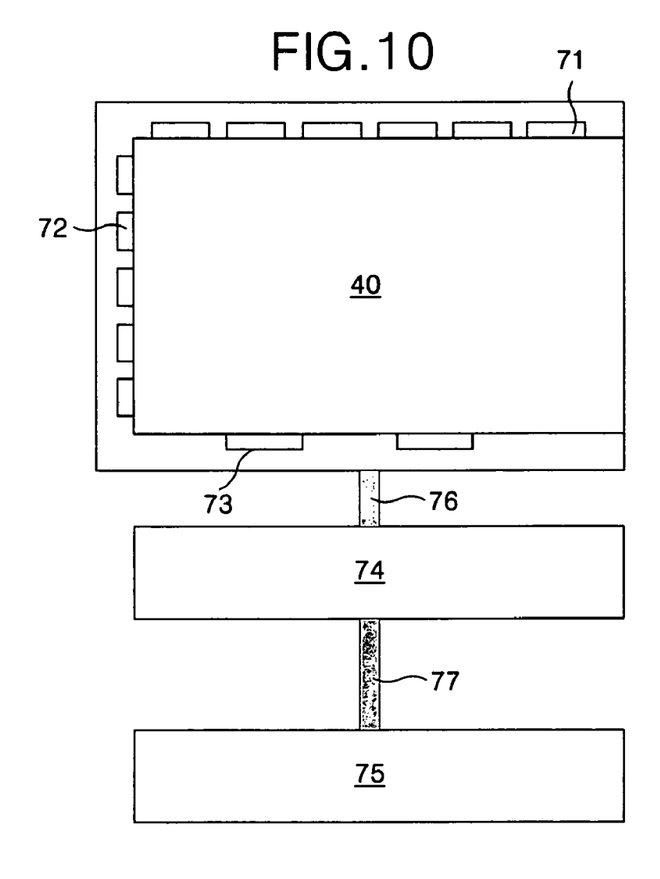
FIG. 10 is a block diagram showing the display having a multi-touch sensing function and a display having a driving circuit.

FIG. 10 shows the liquid crystal display according to an embodiment.

The liquid crystal display includes a data integrated circuit 71, a gate integrated circuit 72, a read-out integrated circuit 73, a digital board 74, and a system circuit board 75. The data integrated circuit 71 is connected to the data line DL of the display panel 40 to supply a data voltage to the data lines DL. The gate integrated circuit 72 is connected to the gate lines G1-Gn of the display panel 40 to sequentially supply a gate pulse or a scanning pulse to the gate lines G1-Gn. The read-out integrated circuit 73 is connected to the read-out lines ROL of the display panel 40 to amplify an electric charge from the read-out lines ROL to produce a voltage signal. The digital board 74 controls the integrated circuits 71, 72, and 73. The system circuit board 75 is connected to the digital board 74.

The data integrated circuit 71 converts digital video data, which is inputted from a timing controller, into analog data voltages. The analog data voltages are supplied to the data lines DL of the display panel 40 in response to a timing control signal, which is applied by the timing controller. Analog data voltages with which the data line DL is supplied are selected from gamma compensation voltages corresponding to gray scale values of the digital video data.

The gate integrated circuit 72 generates a gate pulse to sequentially supply the gate pulse to the gate lines G1-Gn in response to a timing control signal supplied by the timing controller of the digital board 74.

The read-out integrated circuit 73 includes a voltage amplifier, and converts and amplifies an electric charge into a voltage to supply the digital board 74.

The digital board 74 is connected to the integrated circuits 71, 72, and 73 via a cable 76 and an interface circuit, and includes the timing controller, an inverter, and a DC-DC converter. The inverter drives a light source of the backlight unit. The DC-DC converter generates driving voltages for the liquid crystal panel, namely, a gamma compensation voltage, a gate high voltage, and a gate low voltage.

The digital board 74 generates driving power and timing control signals of the integrated circuits, and supplies digital video data for a background image and digital video data of a touch image. The background image and digital video data are inputted from a digital touch image processing circuit to the data integrated circuit 71 to drive and control the integrated circuits, thereby displaying a background and touch images on the display panel 40.

The system circuit board 75 is connected to the digital board 74 via the cable 76 and the interface circuit, and includes a circuit that processes video signals from an external video source, such as a broadcast receiving circuit, a CD, or a DVD, etc.

The digital board 74 or a system circuit board 75 further includes a digital touch image processing circuit that processes a touch image. The digital touch image processing circuit recognizes an infrared light touch sensing signal, which is inputted via a TFT array for sensing light TFTSS, as an image type instead of a coordinate. Furthermore, the digital touch image processing circuit analyzes a pattern of a touch image to detect a touch center or a center of a finger among multiple touch finger images, so as to generate touch image data to be displayed at the display panel 40.

Figure 11:
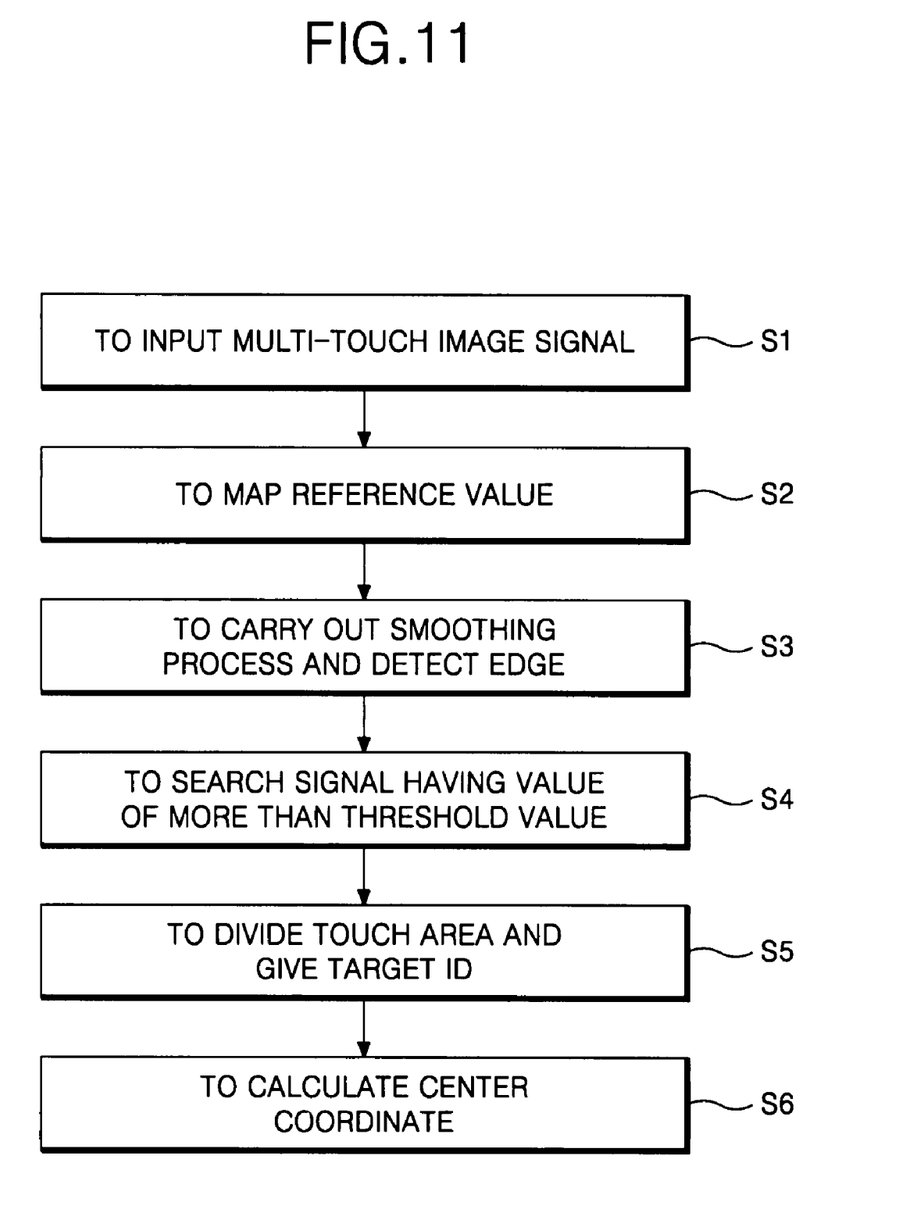
FIG. 11 is a flowchart showing processing of a touch image.

FIG. 11 is a flow chart showing an operation algorithm of a digital touch image processing circuit which is mounted into the digital board 74 or the system circuit board 75.

Pre-set reference values for each touch area are pre-set based on a level of white noise and a deviation of the TFT for sensing light TFTSS. The reference values are stored in the digital touch image processing circuit. Furthermore, a threshold value, which is applied when calculating coordinates for each touch area, is stored in the digital touch image processing circuit. If a digital signal of a touch image is inputted to the digital touch image processing circuit, the digital touch image processing circuit maps reference values to an inputted digital signal to extract touch image data of more than a reference value (S1 and S2). Next, the digital touch image processing circuit smoothes the touch image data, which is extracted in the S2 step, so as to link multiple touch areas and detect an edge of the touch images (S3).

Next, the digital touch image processing circuit compares signals of the touch images, which are detected in the S3 step, with a threshold value to search for signals having a value greater than the threshold value (S4).

Finally, the digital touch image processing circuit divides touch areas of the signals, which have a value greater than the threshold value, and provides a target identification (ID) regarding the touch areas, and then calculates a center coordinate of each touch area using a target ID of the touch areas (S5 and S6).

As described above, the display having a multi-touch sensing function includes an infrared ray to visible ray converting layer CONV and TFTs for sensing light TFTSS to sense multiple touching areas of the display. The display is also relatively thin.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A touch-sensing display screen comprising:
   an upper transparent substrate;
   a lower substrate opposite the upper substrate including a plurality of gate lines and a plurality of data lines;
   an infrared light source configured to illuminate a portion of the upper transparent substrate;
   a light converting layer disposed between the upper and lower substrates configured to convert the infrared light received by the upper transparent substrate to visible light;
   a pixel area on the lower substrate having a first thin-film transistor configured to activate a pixel electrode; and
   a light-sensing thin-film transistor in the pixel area configured to sense the visible light provided by the light converting layer and output a light-sense signal in response thereto,
   wherein the light-sensing thin-film transistor is formed on the lower substrate to correspond with the light converting layer,
   wherein the pixel area further comprises a second thin-film transistor in communication with the light-sensing transistor,
   wherein the first and second thin-film transistors in the same pixel area are simultaneously controlled by a scan signal from a same gate line.

2. The touch-sensing display screen of claim 1, wherein the upper transparent substrate is configured to prevent the infrared light from reaching the light converting layer if no object contacts a surface of the upper transparent substrate; and
   wherein the upper transparent substrate is configured to direct a portion of the infrared light to the light converting layer when an object contacts the surface of the upper transparent substrate causing the infrared light to scatter.

3. The touch-sensing display screen of claim 2, further comprising a signal processing circuit in communication with the light-sense signal configured to correlate the light-sense signal with one or more locations on the surface of the upper transparent substrate contacted by the object.

4. The touch-sensing display screen of claim 1, further comprising a matrix of pixel areas each having a pixel thin-film transistor configured to activate a corresponding pixel electrode.

5. The touch-sensing display screen of claim 4, wherein each pixel area further comprises a light-sensing thin-film transistor.

6. The touch-sensing display screen of claim 4, wherein some of the pixels areas include a light-sensing thin film transistor.

7. The touch-sensing display screen of claim 1, wherein the second thin-film transistor facilitates outputting the light-sense signal.

8. The touch-sensing display screen of claim 7, further comprising a gate line connected to the respective pixel thin-film transistor and to the respective light-sensing transistor to facilitate identification of pixel locations where the light-sensing transistors received the visible light.

9. The touch-sensing display screen of claim 7, further comprising a data line connected to the respective pixel thin-film transistor, wherein activation of both the data line and the gate line activates the corresponding pixel electrode.

10. The touch-sensing display screen of claim 9, further comprising a matrix of pixel areas, each pixel area having a pixel thin-film transistor, and some of the pixel areas having a light-sensing thin-film transistor, wherein identification of the gate and data lines that activate a selected pixel thin-film transistor facilitates identification of a corresponding active light-sensing transistor.

11. The touch-sensing display screen of claim 10, further comprising an image processing circuit configured analyze locations of a plurality of active light-sensing transistors based on the gate and data lines of corresponding pixel thin-film transistors to detect one or more centers of touch.

12. The touch-sensing display screen of claim 11, wherein the image processing circuit is configured to identify a boundary associated with the centers of touch.

13. The touch-sensing display screen of claim 1, wherein the infrared light source illuminates the upper transparent substrate along one or more edges thereof.

14. A display having a multi-touch sensing function, comprising:
an infrared light source that radiates an infrared light; and
a display panel that includes a first transparent substrate which guides the infrared light, an infrared ray-to-visible ray converting layer formed on the first transparent substrate to convert the infrared light from the first transparent substrate into a visible ray, and an optical sensor located under the first transparent substrate to sense the visible ray,
wherein the display panel further includes a second transparent substrate on which the optical sensor is formed,
wherein the second transparent substrate includes a plurality of pixel areas defined a plurality of gate lines and a plurality of data lines, a plurality of first thin-film transistors configured to activate a pixel electrode, and a plurality of second thin-film transistors in communication with the optical sensor,
wherein the optical sensor is formed on the second transparent substrate to correspond with the infrared ray-to-visible ray converting layer,
wherein the first and second thin-film transistors in the same pixel area are simultaneously controlled by a scanning pulse from a same gate line.

15. The display having a multi-touch sensing function according to claim 14, further comprising:
a backlight unit located under the display panel to radiate a light to the display panel.

16. The display having a multi-touch sensing function according to claim 14, wherein the second transparent substrate includes:
the plurality of data lines to which a data voltage is supplied;
the plurality of gate lines crossed with the data lines, and sequentially supplied with the scanning pulse;
a plurality of read-out lines parallel to the data lines configured to output an infrared ray sensing signal corresponding to infrared light reflected from the first transparent substrate;
a pixel electrode formed at a pixel area defined by the data line, the gate line, and the read-out line;
the plurality of first thin film transistors formed at a crossing part of the gate lines configured to supply the data voltage to the pixel electrode in response to the scanning pulse;
a plurality of first driving voltage supplying lines parallel to the gate lines to supply a high-level driving voltage to the optical sensor;
a plurality of second driving voltage supplying lines parallel to the gate lines and the first driving voltage lines, to supply a low-level driving voltage to the infrared ray sensor;
a first storage capacitor charging an electric charge from the optical sensor;
a second storage capacitor formed between the pixel electrode and the gate line to maintain a voltage of the pixel electrode; and
the plurality of second thin film transistors formed at a crossing part of the gate lines and the read-out lines, and in communication with the first storage capacitor to supply an electric charge from a first storage capacitor to the read-out lines in response to the scanning pulse.

17. The display having a multi-touch sensing function according to claim 16, wherein the optical sensor includes:
a thin film transistor driven by the high-level driving voltage and the low-level driving voltage to cause current flow between its source electrode and drain electrode.

18. The display having a multi-touch sensing function according to claim 17, wherein the optical sensor includes:
a gate electrode integrally formed with the second driving voltage supplying line;
a semiconductor layer overlapping the gate electrode with an insulating film therebetween;
a source electrode connected to the first driving voltage supplying line on the semiconductor layer; and
a drain electrode opposite the source electrode on the semiconductor layer.

19. The display having a multi-touch sensing function according to claim 16, wherein the first transparent substrate further includes:
red, green, and blue color filters formed at the same layer as the infrared ray-to-visible ray converting layer; and
a black matrix that is formed at a border between the pixel areas and at an area corresponding to the first and second thin film transistors to shield an infrared light which is incident into the first and second thin film transistors.

20. The display having a multi-touch sensing function according to claim 16, further includes:
- a plurality of data integrated circuits connected to the data lines to convert a digital video data of touch images generated by a physical touch contacting the display panel, into the data voltage to be supplied to the data lines;
- a plurality of gate integrated circuits connected to the gate lines to sequentially supply the scanning pulse to the gate lines;
- a read-out integrated circuit connected to the read-out lines to amplify an electric charge from the read-out lines, thereby outputting an amplified voltage;
- a digital board configured to control the integrated circuits and the digital video data of the touch image; and
- a system circuit board connected to the digital board.

21. The display having a multi-touch sensing function according to claim 20, wherein the digital board or the system circuit board includes a digital touch image processing circuit configured to analyze a pattern of the touch images to detect a center of touch images.

22. A method of driving a display having a multi-touch sensing function comprising:
- irradiating a first transparent substrate with an infrared light;
- converting the infrared light reflected from a surface of the first transparent substrate into a visible ray using an infrared ray-to-visible ray converting layer formed on the first transparent substrate;
- sensing the visible ray using an optical sensor located under the first transparent substrate;
- irradiating a display panel with light generated by a backlight unit located under the display panel; and
- displaying a touch image of the surface of the first transparent substrate on the display panel,
- wherein the display panel comprises a second transparent substrate on which the optical sensor is formed,
- wherein the second transparent substrate includes a plurality of pixel areas defined a plurality of gate lines and a plurality of data lines, a plurality of first thin-film transistors configured to activate a pixel electrode, and a plurality of second thin-film transistors in communication with the optical sensor,
- wherein the optical sensor is formed on the second transparent substrate to correspond with the infrared ray-to-visible ray converting layer,
- wherein the first and second thin-film transistors in the same pixel area are simultaneously controlled by a scanning pulse from a same gate line.

* * * * *